Jan. 19, 1965　　　A. G. MAKOWSKI　　　3,166,488
APPARATUS FOR TREATING THERMOPLASTIC
CONTAINERS BY CORONA DISCHARGE
Original Filed March 31, 1959　　　2 Sheets-Sheet 1

INVENTOR.
ALEXANDER GEORGE MAKOWSKI
BY Leland A. McCann
George W. Reiber
ATTORNEYS

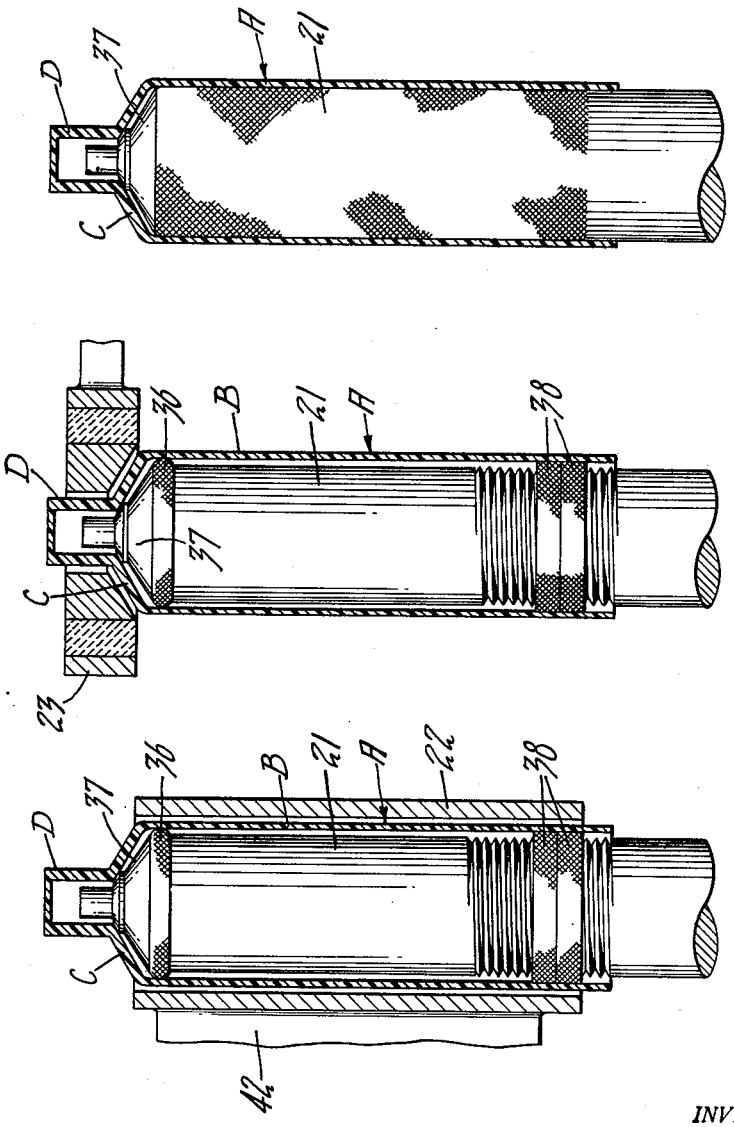

United States Patent Office 3,166,488
Patented Jan. 19, 1965

3,166,488
APPARATUS FOR TREATING THERMOPLASTIC
CONTAINERS BY CORONA DISCHARGE
Alexander George Makowski, Fayville, Mass., assignor to American Can Company, New York, N.Y., a corporation of New Jersey
Continuation of application Ser. No. 803,246, Mar. 31, 1959. This application Dec. 2, 1960, Ser. No. 73,232
11 Claims. (Cl. 204—312)

The present invention relates to the surface treatment of thermoplastic tubing and tubular containers for the reception of protective and decorative coating, inks, adhesives and the like, in a manner which causes them to readily and firmly adhere thereto, and has particular reference to an improved apparatus for treating the surfaces with an electrical corona discharge.

An object of the instant invention is to provide an improved apparatus for treating the interior surfaces of thermoplastic tubing with an electrical corona discharge in such a manner as to expose and treat instantly the entire surface to be treated so as to increase the speed of production and at the same time permit a sufficient period of treatment which insures more uniform treatment.

Another object is to provide for treatment with lower voltage so as to better control the treatment while operating at high speeds of production.

Another object is to provide for accurate location of the tubing to be treated to insure uniform treatment and to prevent burning of the surfaces due to imperfections.

Another object is to provide for the application of different voltages to different and separate surfaces to compensate for differences in the thickness of the material.

Numerous other objects and advantages of the invention will be apparent as it is better understood from the following description, which, taken in connection with the accompanying drawings, discloses a preferred embodiment thereof.

Referring to the drawings:

FIG. 2 is an enlarged sectional view showing a tubular container to be treated in relation to side wall treating electrodes used in the apparatus;

FIG. 3 is a view similar to FIG. 2 showing an electrode at the head of the container; and FIG. 4 is a view similar to FIG. 2 showing a modified form of electrode.

Figure 1:
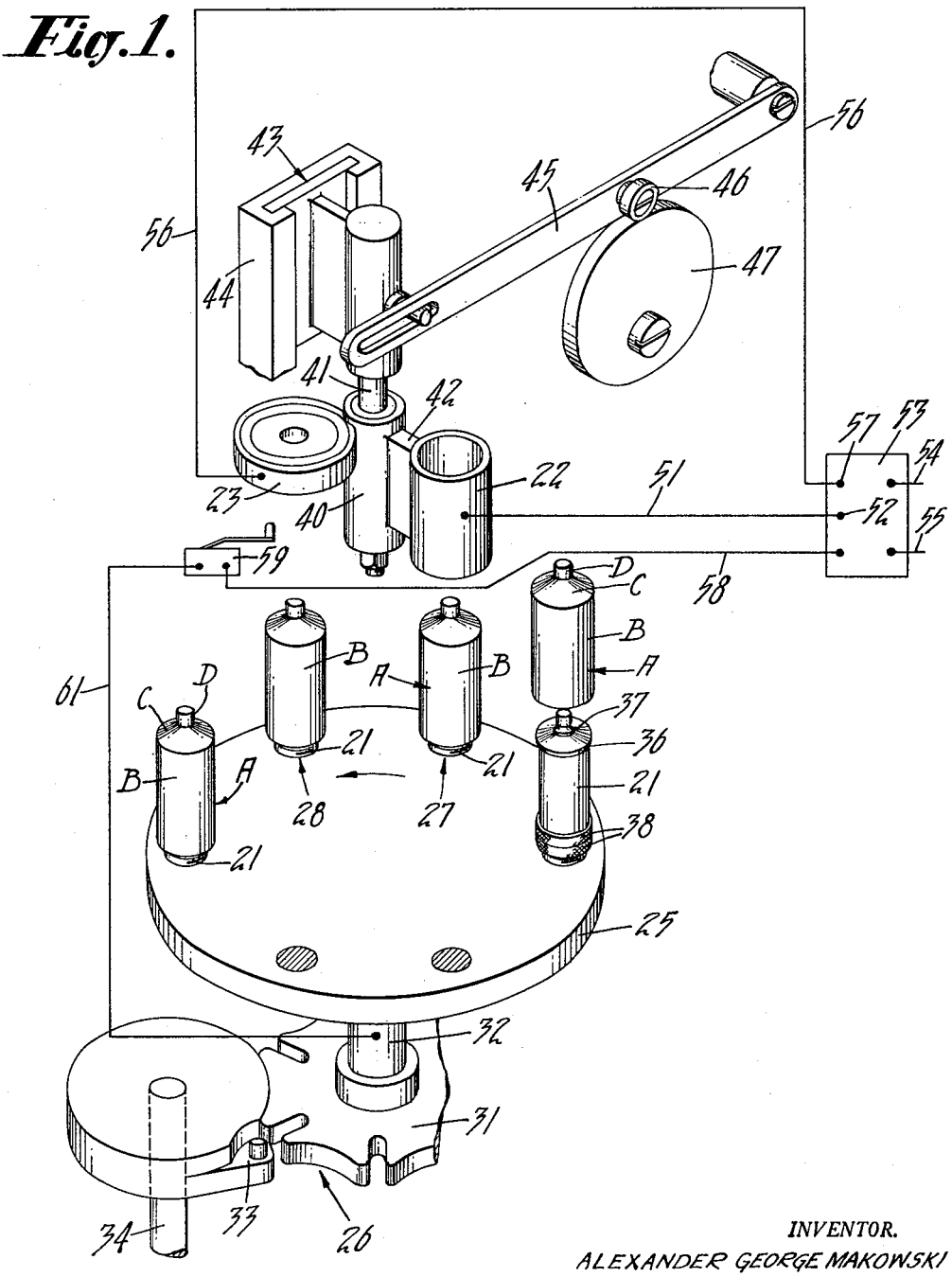
FIG. 1 is a perspective view of an apparatus embodying the instant invention, with parts broken away, the view including a wiring diagram of the electrical apparatus used.

As a preferred and exemplary embodiment of the instant invention, the drawings disclose an improved apparatus for treating by an electrical corona discharge the interior surfaces of thermoplastic material containers A (FIGS. 1 and 2), each comprising a tubular thin walled thermoplastic body B provided at one end with a thicker walled head or end closure C formed with a dispensing nozzle D, which may be plastic or metal. The opposite ends of the containers are open. The containers A preferably are made of polyethylene, although the invention is readily applicable to other thermoplastic materials such as polyamides, polyesters, vinyl polymers and copolymers, polymers of vinylidene chloride, polystyrene and polypropylene and its copolymers.

In the instant apparatus a container A is telescoped over a vertically disposed inner electrode 21 (FIGS. 1 and 2) maintained at ground potential electrically. The containers fit snugly over the electrodes 21 in order to retain them in a centralized position, but the inner surface of the side wall of the container is in spaced relation to the electrode, as will be hereinafter explained, to provide an air gap of from 20- to 40-thousandths of an inch.

The precisely located container A is then surrounded by an outer or tubular shell type electrode 22, as shown in FIG. 2, to provide an air gap similar to the inner air gap adjacent the outer surfaces of the container side wall. With the side wall of the container thus enclosed, a low voltage electrical current in the range of 5,000 volts is applied to the outer electrode 22 and this sets up between the inner and the outer electrode a corona discharge which treats the inner surfaces of the side wall of the container.

Since the head C of the container A is of much thicker material, the inner surfaces of this head portion are treated separately at a greatly increased voltage. For this purpose, the outer shell electrode 22 is withdrawn from the container and a head electrode 23, having a recess to conform to the shape of the head C, is moved into place over the head, in spaced relation thereto to create an air gap adjacent the outer surface of the head as best shown in FIG. 3. With the head electrode 23 in place, a high voltage in the range of 20,000 volts is applied to the head electrode and this sets up between the head electrode and the inner electrode a corona discharge which treats the inner surfaces of the head C. This completes the treatment.

In order to effect this surface treatment at high speed with efficiency and uniformity, a plurality of the inner electrodes 21 are mounted in circular fashion, in spaced relation on a rotatable disc or turret 25 (FIG. 1) which is indexed or partially rotated by an indexing device 26 to advance each inner electrode 21 into a side wall treating station 27 and then into a head treating station 28. The indexing device 26 may be any conventional interrupted movement device such as a Geneva wheel 31 mounted on the disc shaft 32, and a continuously rotating Geneva arm 33 mounted on a shaft 34 rotated in any suitable manner.

The inner electrodes 21 preferably are cylindrical and disposed in an upright position on the indexing disc 25. At its upper end each electrode 21 is formed with a slightly enlarged ring or collar 36 (FIG. 2) which is of an outside diameter substantially equal to the inside diameter of the container body B to provide a snug sliding fit within the body and thus hold the body in a precisely centralized or located position when the body is telescoped over the electrode. The outer face of the collar 36 is generally and uniformly pitted, for example by knurling as shown, or by grooving in order to provide an air gap adjacent the major portion of the inner surface of the container side wall and to provide a minimum of point or line contact with the container. That is to say, the adjacent container surface is in contact with a plurality of slightly spaced projections having minimum contact area with the surface to be treated, said projections also presenting proximate conductive lateral approach surfaces or bridging areas spaced just barely out of contact with the container surface to act as a source of corona discharge treatment over a major portion of that section of the container which is adjacent the collar 36.

Above the collar 36 the upper end of the inner electrode 21 is formed with a conical nose 37 to conform to the shape of the inner surface of the container head C but is dimensioned to provide an air gap between the surface of the nose 37 and the inner surface of the head C.

At its lower end, the electrode 21 is provided with two lock rings or collars 38 which preferably are threaded onto the electrode so as to be adjustably positionable thereon, and which are of the same outside diameter as the upper collar 36 for the same purpose of fitting snugly within the container body B to retain it in a precisely located position. The outer surfaces of these lock collars 38 are pitted or provided with projections the same as the upper collar 36 and for the same purpose. These collars 36, 38 form a part of the electrode, the lower or lock collars 38 being located in a predetermined relation to the bottom edge of the container body B as shown in FIG. 2, to prevent treatment of a bottom marginal area to facilitate subsequent heat sealing of the container after filling. The telescoping of the container A over the electrode 21 may be effected in any suitable manner.

A modified form of the inner electrode is shown in FIG. 4, in which the collars 36, 38 are omitted and the entire length of the electrode, down to the sealing portion of the container, is pitted or provided with projections as by knurling, to provide the air gap adjacent the major portion of the inner surface of the container side wall, while maintaining a minimum contact with the container to hold it on the electrode in a snugly fitting centralized position. Since the smooth electrode surface at the sealing area of the container provides no air gap, no corona discharge takes place at this area, hence this portion of the container is left untreated as desired.

The outer or shell electrode 22 is located at the side wall treating station 27, above the path of travel of the inner electrodes 21 as best shown in FIG. 1, and the head electrode 23 is similarly located at the head treating station 28. These two electrodes 22, 23 are movable simultaneously and for this purpose preferably are attached to an electrical insulating member 40 which is secured to a vertically movable rod 41 which depends from a slide 42 operating in a vertical slideway 43 in a stationary bracket 44. The slide 42 is reciprocated in time with the indexing of the disc 25, through a lever 45 having a cam roll 46 which operates on an edge cam 47. The cam 47 is rotated in any suitable manner in time with the indexing of the disc 25.

Electrically, the outer electrode 22 is connected by a wire 51 to a 5,000 volt contact 52 of a conventional high frequency high tension electric power or amplifying unit 53 which in turn is connected by wires 54, 55 to a suitable source of electric current such as a generator (not shown). In a similar manner the head electrode 23 is connected by a wire 56 to a 20,000 volt contact 57 of the power unit 53. The power unit 53 is also connected by a wire 58 to a normally open switch 59 which is connected by a wire 61 grounded to the machine by connection to a part thereof connected to the inner electrodes 21. The switch 59 is disposed in the path of travel of the slide rod 41 or the slide 42 for engagement thereby at the lowest point of travel of these parts.

Hence as the slide 42 reciprocates in synchronism with the indexing of the disc 25, the slide lowers the outer electrode 22 and the head electrode 23 simultaneously into position relative to the side wall B of one container at the side wall treating station 27 and relative to the head C of another container at the head treating station 28. When the slide moves down to its lower limit at which time the electrodes are fully in place, the slide engages and closes the switch 59. This action causes 5,000 volts to be imposed across the gap between the outer electrodes 22 and the inner electrode 21 at station 27 to set up the corona discharge along the entire inner surface of the side wall of the container A at station 27 and simultaneously causes 20,000 volts to be impressed across the gap between the electrode 23 and the nose 37 of the inner electrode 21 at station 28 to set up the corona discharge adjacent the inner surface of the head C of the container at station 28.

In this manner the side wall of one container is treated simultaneously with the treatment of the head of another container, the two treatments being effected at the proper voltage to facilitate efficiency and uniform treatment at high speed rates of production. Through design of the cam 47 the switch 59 may be caused to remain closed for any period of time desired to obtain a desired treatment of the container surfaces without impairing the speed of the production.

This application is a continuation of my application Serial No. 803,246, filed March 31, 1959 and now abandoned.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for treating the side wall and head surfaces of tubular thermoplastic containers having one end thereof open, comprising a first electrode for holding a container telescoped thereover, said electrode having spaced means on its surface to snugly engage the inner surfaces of the container at spaced points and provide substantial air gap between said electrode and the interior of the container, a second tubular electrode movable into position surrounding said first electrode and being dimensioned to provide an annular space between its inner surface and said spaced means on said first electrode to receive the side wall of the container, a head electrode movable into position over the end of said first electrode in spaced relation thereto to provide an end space to receive the head of the container, means for moving said second and said head electrodes into their respective positions, and means for impressing one voltage between said first and second electrodes to produce a corona discharge therebetween to treat the side wall of the container and for impressing another voltage between said head and first electrodes to produce a corona discharge therebetween to treat the head of the container.

2. An apparatus for treating surfaces of a tubular thermoplastic article having an end open comprising an inner electrode for holding the container telescoped thereover, said inner electrode including a plurality of collars in spaced relation along its length to fit snugly within the article and hold it in position and a cylindrical portion between said collars, said cylindrical portion being of lesser diameter than said collars to provide a predetermined air gap between its surface and the interior of the article, the outer surfaces of said collars being pitted to provide substantial air gap area adjacent the inner surface of the article and greatly reduced contact therewith, a tubular outer electrode movable into position surrounding said inner electrode, means for moving said outer electrode into said position, and means for impressing a voltage drop between said electrodes to generate a corona discharge therebetween.

3. An apparatus of the character defined in claim 1 wherein said one voltage is a low voltage and wherein said another voltage is a high voltage.

4. An apparatus of the character defined in claim 1 wherein said second electrode is disposed at one station in said apparatus and said head electrode is disposed at another station in said apparatus, and wherein there is provided means for moving said first electrode with its held container from one station to the other.

5. An apparatus of the character defined in claim 1 wherein there is provided a plurality of said first electrodes for receiving and holding a plurality of containers, means for moving said first electrodes with their held containers successively into a side wall treating station and a head treating station, and wherein said second electrode is disposed at said side wall treating station above the path of travel of said first electrodes and said head electrode is disposed at said head treating station above the path of travel of said first electrode, said means for moving said second and said head electrodes being operable to move them into treating position at said stations to effect treatment of said container side wall and head surfaces in succession.

6. An apparatus of the character defined in claim 5 wherein said first electrodes are mounted on a rotatable disc and wherein there is provided means for intermittently rotating said disc to index said first electrodes from one to the other of said stations for treatment of said containers.

7. An apparatus of the character defined in claim 5 wherein said second electrode and said head electrode are secured to a common actuating member and are movable simultaneously at their respective stations to treat the side wall of one container at said side wall treating station and to simultaneously treat the head of another container at said head treating station.

8. An apparatus of the character defined in claim 7 wherein there is provided electric means operable by said common actuating member and connected to said electrodes and to a source of electric current to apply and cut off said voltage in time with the movement of said actuating members.

9. An apparatus of the character defined in claim 1 wherein said first electrode is a cylindrical member having an outside diameter substantially equal to the inside diameter of said container to snugly fit within said container to hold it in position, said electrode outside surface being pitted to provide substantial air gap area adjacent the inner surface of said container and greatly reduced contact with said surface.

10. An apparatus of the character defined in claim 9 wherein said first electrode at one end is provided with a nose conforming to the inner surface of said container head and dimensioned to provide an air gap between said nose and the inner surface of the head of a container telescoped over said first electrode.

11. An apparatus for treating surfaces of a tubular thermoplastic article having an open end, said apparatus comprising an inner electrode for holding the article telescoped thereover, said inner electrode being a cylindrical member having an imperforate and substantially uniformly pitted exterior surface having multiple spaced high points of small area for contacting and supporting the interior surface of the article to be treated and multiple spaced low points of substantial area between said high points to provide substantial air gaps adjacent the interior surface of the article, a tubular outer electrode movable into position surrounding said inner electrode, means for moving said tubular outer electrode into position, and means for impressing a voltage between said electrodes to generate a corona discharge therebetween.

References Cited in the file of this patent
UNITED STATES PATENTS

| | | |
|---|---|---|
| 2,658,868 | Collison | Nov. 10, 1953 |
| 2,844,731 | Plonsky | July 22, 1958 |
| 2,864,755 | Rothacker | Dec. 16, 1958 |
| 2,876,358 | Root | Mar. 3, 1959 |
| 3,021,270 | Tarbox et al. | Feb. 13, 1962 |